United States Patent [19]

Christiansen

[11] 4,108,593
[45] Aug. 22, 1978

[54] METHOD OF HEAT TREATING PULVERULENT OR GRANULAR RAW MATERIALS AND KILN PLANT THEREFOR

[75] Inventor: Søren Bent Christiansen, Copenhagen Valby, Denmark

[73] Assignee: F. L. Smidth & Co., Cresskill, N.J.

[21] Appl. No.: 736,240

[22] Filed: Oct. 27, 1976

[30] Foreign Application Priority Data

Oct. 27, 1975 [GB] United Kingdom ............... 44073/75

[51] Int. Cl.$^2$ ........................... F27B 15/00; F27B 7/02
[52] U.S. Cl. ....................................... 432/14; 432/58; 432/106
[58] Field of Search ....................... 432/14, 15, 58, 106

[56] References Cited

U.S. PATENT DOCUMENTS

| | | | |
|---|---|---|---|
| 3,864,075 | 2/1975 | Christiansen | 432/106 |
| 3,881,861 | 5/1975 | Ritzmann | 432/106 |
| 3,914,098 | 10/1975 | Kano et al. | 432/106 |
| 3,938,949 | 2/1976 | Christiansen | 432/14 |
| 3,940,241 | 2/1976 | Houd | 432/106 |
| 3,947,238 | 3/1976 | Fukuda et al. | 432/14 |
| 4,002,420 | 1/1977 | Christiansen | 432/14 |
| 4,022,568 | 5/1977 | Meedom | 432/14 |
| 4,045,162 | 8/1977 | Christiansen | 432/14 |

*Primary Examiner*—John J. Camby
*Attorney, Agent, or Firm*—Pennie & Edmonds

[57] ABSTRACT

A method is disclosed for heat treating pulverulent or granular raw material such as cement meal. Raw material is directed to at least two multi-stage preheater strings, the first string communicating with the kiln by a smoke riser pipe and the second string having a calciner positioned at its lower end portion. The raw material directed to the first preheater string is divided into two divisional flows with the first divisional flow comprising substantially the maximum amount of material which can be substantially completely calcined by hot gases exiting the kiln. The first divisional flow of raw material is directed toward the upper material inlet end portion of the kiln so as to be entrained by the hot gases exiting the kiln, and the hot kiln gases and entrained material are directed to the first preheater string. The second divisional flow is directed to the second preheater string where it is calcined either alone or with raw material directed to the second string. The substantially completely calcined material exiting the first preheater string and at least partially calcined raw material exiting the second preheater string are directed to the upper material inlet end portion of the kiln at a location and in a manner so as to avoid entrainment by the hot exit gases and pass down through the kiln for further heat treatment. A plant is disclosed for practicing the inventive method.

7 Claims, 3 Drawing Figures

METHOD OF HEAT TREATING PULVERULENT OR GRANULAR RAW MATERIALS AND KILN PLANT THEREFOR

BACKGROUND OF THE INVENTION

1. Field of the Invention

This invention relates to a method and plant for preheating and calcining pulverulent or granular raw material, such as cement raw meal prior to passing it down to a kiln for further heat treatment.

2. Description of the Prior Art

Prior art plants for heat treating pulverulent or granular raw material such as cement raw meal have been known to consist of one or more preheater strings, a rotary kiln and a cooler for cooling the product treated in the kiln. The preheater strings are fed with either hot kiln gases exiting from the upper material inlet end portion of the kiln, or with spent cooling air which passes directly from the cooler to a specified string. Each string may further be provided with a calciner for completely or partially calcining the raw material fed to the string before the material passes to the kiln. Commonly assigned U.S. Pat. No. 3,864,075 filed Apr. 29, 1974, is an example of a kiln plant according to the prior art. The kiln plant consists of two multi-stage preheater strings, one of which is fed with kiln exit gases — called the "kiln string" — and the other — called the "cooling air string" — is provided with a calciner coupled between its last stage and its penultimate stage and is fed with spent air from the cooler. The raw material fed to each preheater string is at least partially preheated and passes to the calciner in the cooling air string for joint precalcining. From the calciner, the materials pass through the last preheater stage of the cooling air string to the upper material inlet end portion of the kiln.

Another prior art plant construction is disclosed in U.S. patent application Ser. No. 626,478, filed Oct. 28, 1975 now U.S. Pat. No. 4,045,162, dated Aug. 30, 1977. The plant is provided with calciners in each of the preheater strings and precalcining takes place separately in each individual string before the treated material passes to the kiln.

In both of the above-mentioned plants the desired percentage of calcining of the material treated in the calciners is not always achieved. Further, very hot kiln exit gases must be fed to the kiln string to attain an efficient preheating and/or calcining temperature. This creates a risk of heat damage to the material inlet end portion of the kiln and its surrounding structure. I have invented a method and a plant which avoids these drawbacks and provides an improved approach for preheating and precalcining raw material such as cement raw meal.

SUMMARY OF THE INVENTION

A method for heat treating pulverulent or granular raw material in a plant including a kiln having an upper material inlet end portion and a lower material outlet end portion, and cooling means communicating with the lower material outlet end portion of the kiln for cooling the material exiting therefrom is disclosed. The plant for carrying out the method according to the invention also includes at least two multi-stage preheater strings, the first preheater string having a last stage communicating with the upper material inlet end portion of the kiln, and means communicating the upper material inlet end portion of the kiln with the last stage of the first preheater string such that hot kiln exit gases are directed from the upper material inlet end portion of the kiln to the last stage of the first preheater string. Calcining means is associated with the second preheater string and the plant further includes means communicating the calcining means with the cooling means. Raw material is directed to each of the multi-stage preheater strings, and hot kiln exit gases are introduced to the first preheater string in such a manner so as to contact the raw material and effect heat exchange between the raw material and the hot kiln gases. Heated cooling air from the cooling means is introduced to the calcining means of the second preheater string to be used as combustion and preheating air. The preheated raw material of the first preheater string is divided into at least two divisional flows, a first divisional flow having substantially the maximum amount of raw material which can be substantially completely calcined by the kiln exit gases. The first divisional flow of raw material is directed from the first preheater string toward the upper material inlet end portion of the kiln so as to cause the first divisional flow of material to be entrained within the hot gases exiting the kiln and thereby be substantially completely calcined therein. The method further comprises directing the hot kiln gases and entrained first divisional flow of material to the first preheater string and separating the substantially completely calcined first divisional flow of material from the hot kiln exit gases. The second divisional flow is directed from the first preheater string to the second preheater string and calcined in the calcining means of the second preheater string. According to the inventive method the material exiting from the first and second preheater strings is introduced to the upper material inlet end portion of the kiln at a location in such a manner so as to avoid entrainment of the hot kiln exit gases and pass down the kiln for further heat treatment.

The desired extent of precalcining of the raw material is thus achieved by dividing the raw material preheated in the kiln string into divisional flows of an appropriate ratio. This ensures a flow of raw material which is completely or almost completely calcined in the kiln inlet and/or the riser pipe, prior to being united with the raw material calcined in the calciner and passed to the kiln. In its preferred embodiment the divisional flow of raw material calcined in the riser pipe and/or in the material inlet end of the kiln constitutes 15–25% of the total amount of raw material fed to the plant.

The material of the first preheater string may be separated and divided into at least two divisional flows in a known manner. For example, an appropriate preheater stage in the kiln string may be constructed of more than one cyclone so that each cyclone may receive one of the divided flow of material. When the raw material calcined in the kiln inlet (or the riser pipe) meets the hot exit gases, there is a substantial reduction in the temperature of the exit gases in the kiln inlet compared to their working temperature during the actual kiln process. Also, the calcining process is simultaneously initiated with the reduction in temperature of the kiln exit gases.

The invention enables the achievement of a stable medium extent of calcination by precalcining only a limited divisional flow of raw material from the kiln string in the riser pipe and/or the kiln inlet. The invention ensures that this precalcining is complete (or almost complete) because the volume of the limited divisional flow is adapted to the amount of heat contained in the exit gases. The divisional flow thus precalcined subsequently ensures an improved extent of calcining of the remaining raw material which has been precalcined in the calciner. A desired reduction in the temperature of the exit gas in the kiln inlet also is achieved by the supply of the limited divisional flow of raw material for precalcining at this locality. It is therefore possible to reduce the heat damage and deterioration of the kiln inlet and its surrounding structure without lowering the working temperature within the kiln proper.

Further, it is found advantageous to feed the limited divisional flow of raw material to the riser pipe between the kiln and the kiln string so that the risk of cakings in the riser pipe is reduced. This would not occur if the total amount of raw material is passed instead to a calciner.

The invention also relates to a plant for heat treating pulverulent or granular raw material according to the above method which comprises a kiln having an upper material inlet end portion and a lower material outlet end portion, and means for cooling the material exiting the lower material outlet end portion of the kiln and communicating therewith. At least two multi-stage preheater strings are included in the plant and the first preheater string has means for directing raw material thereto and a last stage communicating with the upper material inlet end portion of the kiln in a manner such that hot kiln exit gases are directed from the upper material inlet end portion of the kiln thereto. The plant also comprises means associated with the second preheater string for calcining preheated raw material directed thereto, and means communicating said calcining means of the second preheater string with a cooling means for directing heated cooling air from the cooling means to the calcining means of the second preheater string. The plant further comprises means for dividing the raw material directed to the first preheater string into at least two divisional flows with the dividing means adapted to provide at least a first divisional flow comprised of substantially the maximum amount of raw material substantially completely calcinable by contact with the kiln exit gases. Further, the plant comprises means for directing a first divisional flow from the first preheater string toward the material inlet end portion of the kiln so as to be entrained by the hot gases exiting the kiln, and means for directing a second divisional flow from the first preheater string to the second preheater string. According to the invention, the plant also comprises means for introducing the material from the first and second preheater strings to the upper material inlet end portion of the kiln at a location and in such a manner so as to avoid entrainment of the hot kiln exit gases and pass down through the kiln for further heat treatment.

BRIEF DESCRIPTION OF THE DRAWINGS

Preferred embodiments of the invention are described hereinbelow with reference to the drawings wherein.

DETAILED DESCRIPTION OF THE PREFERRED EMBODIMENTS

Figure 1:
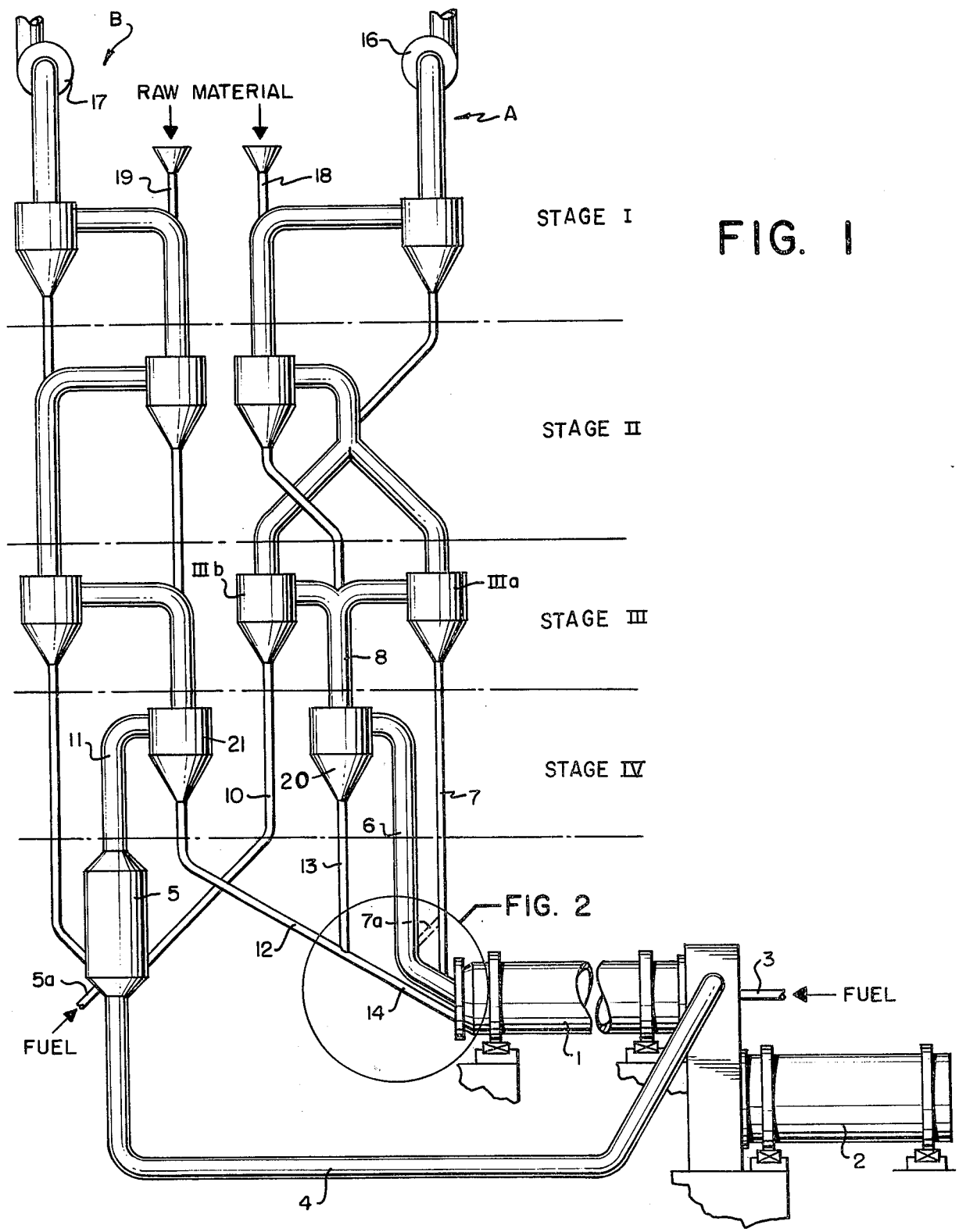
FIG. 1 is a side elevational view of the rotary kiln plant constructed according to the invention.
Figure 2:
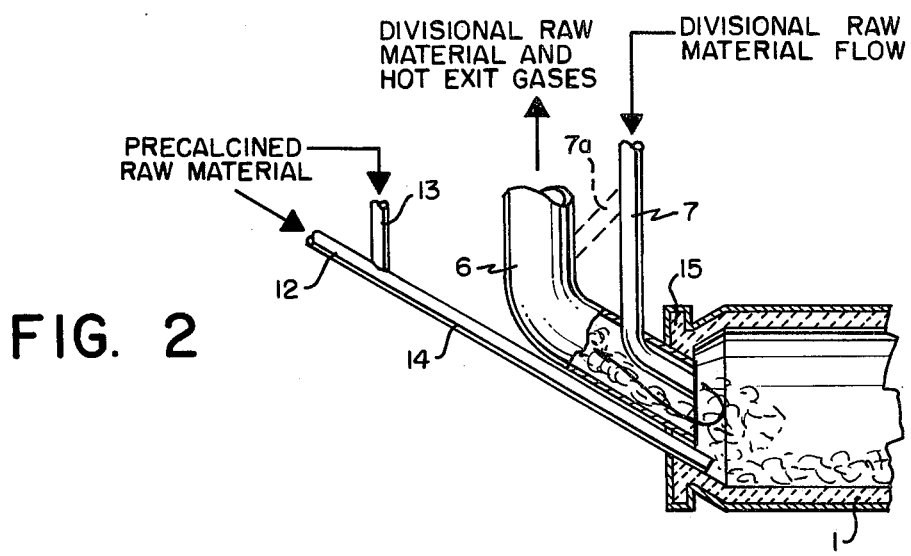
FIG. 2 is a side view, partly in cross-section, of the upper material inlet end of the kiln in FIG. 1.

Referring to FIGS. 1 and 2, there is illustrated a plant having a rotary kiln 1, a cooler 2 coupled after the kiln, two preheater strings "A" — the kiln string — and "B" — the cooling air string. A riser pipe 6 feeds air comprising hot kiln gases to the preheater string "A" and a pipe 4 feeds air comprising waste cooler air from the cooler to the preheater string "B." A burner in the kiln has a fuel supply 3. The two preheater strings, "A" and "B." are shown as 4-stage cyclone strings, and the stages from inlet to outlet are denoted as Stages I, II, III and IV. The cooling air string "B" also comprises a calciner 5 with fuel supply 5a. In a known manner, the cyclone stages of each string are interconnected by riser pipes and raw material supply pipes. The air passed to the lowermost stage, Stage IV, of the strings "A" and "B" is drawn into the strings by means of fans 16 and 17, respectively, and raw material is fed to the strings at 18 and 19, respectively.

The third cyclone stage, Stage III, in the kiln string "A" consists of two cyclones IIIa and IIIb, constructed so that the amount of raw material supplied to that stage is divided into two flows. 15-20% of the total amount of raw material passes into the cyclone IIIa through a pipe 7 and discharges into the kiln upper material inlet end. The remaining portion of raw material supplied to the kiln string "A" passes into the cyclone IIIb through a pipe 10 and discharges into the calciner 5 of the cooling air string "B."

In the kiln inlet proper (see FIG. 2), the divisional flow of raw material from the cyclone IIIa meets the hot kiln exit gases and is entrained therein. The gases and entrained material pass through a riser pipe 6 and into the lowermost cyclone stage 20 of the kiln string "A."

The addition of the relatively cool raw material to the hot kiln gases at the material inlet end of the kiln, immediately reduces the temperature of the kiln inlet and the riser pipe 6. Further, calcining starts when the raw material and the kiln exit gases meet, and is totally completed (or nearly completed) before the raw material leaves the riser pipe 6. By regulating the volume of the divisional flow to the material inlet end of the kiln with respect to the amount of heat contained in the exit gases of the kiln inlet, complete (or almost complete) calcining of the divisional flow is ensured.

The raw material calcined in the riser pipe 6 and/or in the kiln inlet, passes via cyclone stage 20 in the kiln string "A" through a pipe 13 to a pipe 14. The raw material treated in the calciner 5 passes via cyclone stage 21 of the cooling air string "B" through a pipe 12 to the pipe 14. These two precalcined raw material flows mix in the pipe 14 and pass into the bottom of the material inlet end of the kiln where they pass directly into the kiln charge.

When the raw material treated in the riser pipe 6, which has a stable high degree of precalcination, is added in the pipe 14 to the raw material treated in the calciner 5, experience indicates that it is possible to ensure a medium degree of calcination of the total amount of raw material fed to the plant. Before the raw material is fed to the kiln for further treatment, a more stable degree of calcination is thus obtained in the plant according to the present invention than in the previously known plants.

The supply of raw material fed through the pipe 7 may instead take place higher up the riser pipe 6. The lower part of pipe 7 is replaced by a pipe 7a which ensures a more efficient suspension of the material in the exit gases within the riser pipe proper and consequently the achievement of the best possible degree of precalcination in the riser pipe. Simultaneously, this results in a smaller decrease in the temperature of the exit gases at the kiln inlet which correspondingly decreases the possibilities of sparing the construction of the plant — for example, the rotating sealing 15 around the kiln inlet.

Figure 3:
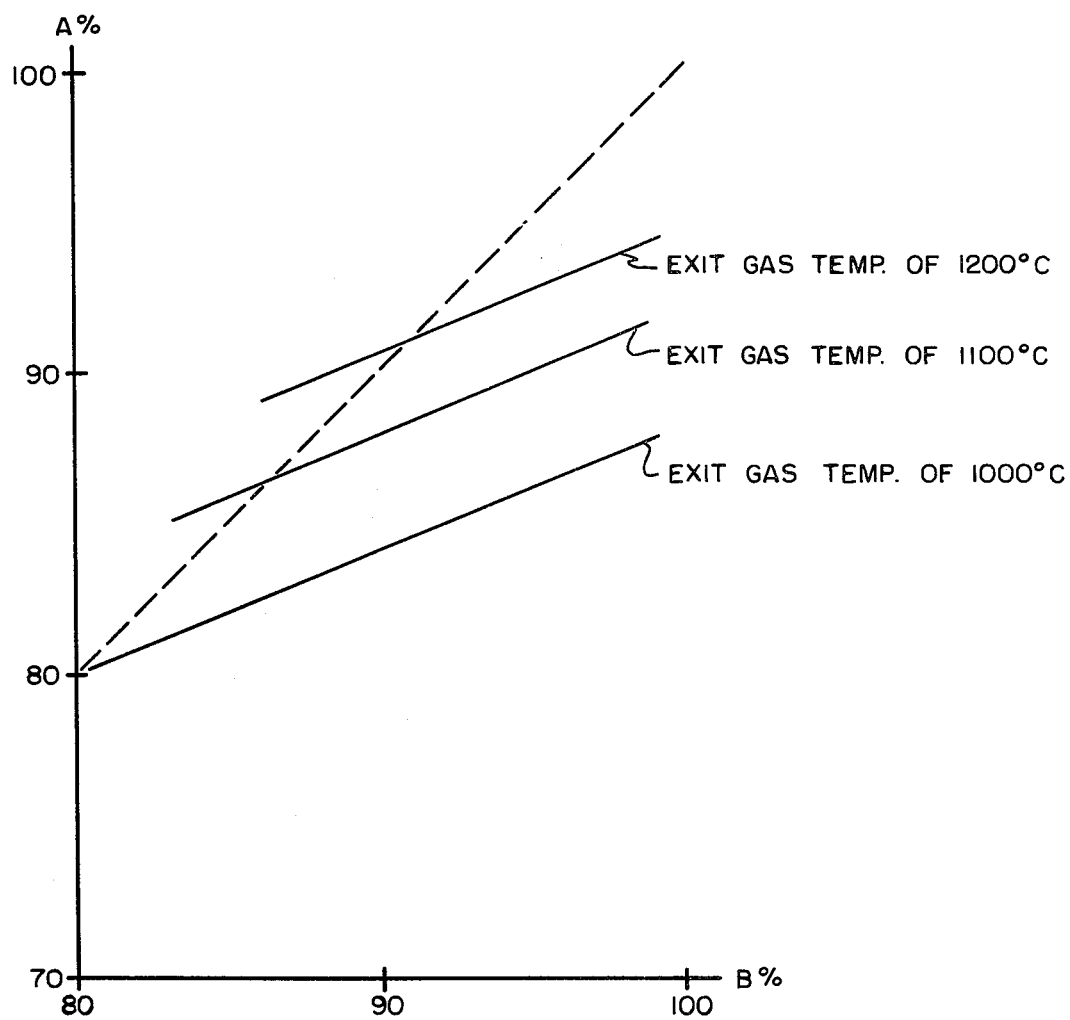
FIG. 3 is a graph comparing the stability of the degree of calcination attained by the prior art and by the present invention.

FIG. 3 illustrates graphically the improvement of the present invention over the prior art with respect to the stability of calcination at the kiln inlet. In a prior art arrangement having multi-string, multi-stage preheaters, all of the material fed to a first preheater string "A" was calcined exclusively in a calciner located in another preheater string (denoted string "B"). The stippled line of FIG. 3 is a plot — based upon calculations — of the percentage of calcination in the string "A" versus the percentage of calcination in the string "B" according to the prior art. In the present invention having at least two multi-stage preheater strings, only a portion of the raw material fed to the string "A" is calcined in another preheater string (denoted string "B"). The solid lines of FIG. 3 are plots — based upon calculations — of the percentage of calcination in the string "A" versus the percentage of calcination in the string "B" for various kiln exit gas temperatures (1000°, 1100° and 1200° C), according to the present invention.

When the percentage of calcination in the string "A" is generally not effected by varying the degree of calcination in the string "B," a stable degree of calcination results. In FIG. 3, a line having a substantially zero slope (generally parallel to the abscissa of the graph) would indicate a highly stable degree of calcination because the change in the percentage of calcination in the string "A" would be substantially negligible.

As can be seen from FIG. 3, the solid lines are sloped less than the stippled line. Substantially more stable precalcining therefore is achieved in a plant constructed according to the present invention (solid lines) — in which a division of the amount of raw material in the kiln string is made prior to the calcining — than in plants in which the total amount of raw material from the kiln string is passed on for calcining in another string (stippled line).

I claim:

1. A method for heat treating pulverulent or granular raw material in a plant including a kiln having an upper material inlet end portion and a lower material outlet end portion, cooling means communicating with the lower material outlet end portion of the kiln for cooling the material exiting therefrom, at least two multi-stage preheater strings, the first preheater string having a last stage, a riser pipe communicating the upper material inlet end portion of the kiln with the last stage of the first preheater string to direct hot kiln exit gases from the upper material inlet end portion of the kiln to the last stage of the first preheater string, calcining means connected to the second preheater string, means communicating said calcining means with said cooling means comprising:

(a) directing raw material to each of said multi-stage preheater strings;
    (b) introducing hot kiln exit gases upwardly through the first preheater string so as to contact the raw material and effect heat exchange between the raw material and the hot kiln gases;
    (c) introducing heated cooling air from the cooling means to the calcining means of said second preheater string to be used as combustion and preheating air;
    (d) dividing the preheated raw material of the first preheater string into at least two divisional flows;
    (e) controlling said first divisional flow so as to include substantially the maximum amount of raw material which can be substantially completely calcined exclusively by the kiln exit gases;
    (f) directing said first divisional flow of raw material from the first preheater string generally toward the upper material inlet end portion of the kiln at a location and in a direction to cause said first divisional flow of material to be entrained within the hot gases exiting the kiln in the kiln riser pipe so as to be at least substantially completely calcined therein;
    (g) directing the hot kiln exit gases and said entrained first divisional flow of material to the first preheater string;
    (h) separating said at least substantially completely calcined first divisional flow of material from the hot kiln exit gases;
    (i) directing said second divisional flow of raw material from the first preheater string to the calcining means of the second preheater string to be combined with the raw material preheated in the second preheater string;
    (j) at least partially calcining the second divisional flow of material in the calcining means of the second preheater string;
    (k) combining the materials from the first and second preheater strings; and
    (l) directing the combined materials to the upper material inlet end portion of the kiln at a location upstream with respect to the flow of kiln exit gases, of the point of entrainment of said first divisional flow of material, and in such a direction so as to avoid entrainment by the hot kiln exit gases and pass down through the kiln for further heat treatment.

2. The method according to claim 1 further comprising:

(a) combining the substantially completely calcined material exiting the first preheater string with at least partially calcined material exiting the second preheater string; and
    (b) directing the combined material to the upper material inlet end portion of the kiln at a location upstream with respect to the kiln exit gases, of the location at which the first divisional flow is entrained by the hot kiln exit gases.

3. The method according to claim 2 wherein the step of dividing the preheated raw material of the first preheater string comprises providing a first divisional flow of raw material having therein approximately 15 to 20 percent of the total amount of raw material directed to the plant so that said first divisional flow of raw material is substantially completely calcinable by the kiln exit gases.

4. A method for preheating and precalcining pulverous, or granular raw material in a plant including a rotary kiln having an upper material inlet end portion and a lower material outlet end portion, a clinker cooler connected to the lower material outlet end portion of the kiln, at least two multi-stage cyclone preheater strings, the first preheater string having a last cyclone stage, a riser pipe communicating the upper material inlet end portion of the kiln with the last cyclone stage of the first preheater string so that the hot kiln exit gases are directed from the upper material inlet end portion of the kiln to the last cyclone stage of the first preheater string, a calciner connected to the second preheater string, means communicating said calciner with the clinker cooler comprising;
(a) directing raw material to each of said multi-stage preheater strings;
(b) introducing hot kiln exit gases upwardly through the first preheater string so as to contact the raw material and effect heat exchange between the raw material and the hot kiln gases;
(c) introducing heated cooling air from the clinker cooler to the calciner of the second preheater string so as to contact the raw material to effect a heat exchange in the second preheater string and for use as combustion air in the calciner;
(d) dividing the preheated raw material of the first preheater string into at least two divisional flows;
(e) controlling said first divisional flow so as to comprise approximately 15 to 20 percent of the total amount of raw material directed to the preheater strings, the first divisional flow thereby being comprised of substantially the maximum amount of raw material which can be substantially completely calcined in the riser pipe by the kiln exit gases;
(f) directing said first divisional flow of raw material from the first preheater string generally to at least one of the upper material inlet end portion of the kiln and said riser pipe at a location and in a direction so as to be entrained by the hot gases exiting the kiln so as to flow upwardly through the riser pipe and thereby be substantially completely calcined exclusively by the hot kiln exit gases;
(g) directing the hot kiln exit gases and said entrained first divisional flow to the last cyclone stage of the first preheater string;
(h) separating said entrained first divisional flow of material substantially completely calcined exclusively by the hot kiln gases in the last cyclone stage of the first preheater string;
(i) directing said second divisional flow of material from the first preheater string to the calciner of the second preheater string for at least partially calcining therein;
(j) combining in the calciner and at least partially calcining said second divisional flow of material and said preheated material of the second string preheater;
(k) combining said substantially completely calcined material exiting the first preheater string with said at least partially calcined material of the second preheater string; and
(l) introducing the combined material to the upper material inlet end portion of the kiln at a location upstream with respect to the flow of kiln exit gases, of the point of entrainment of said first divisional flow of material so as to avoid entrainment by the hot gases exiting the kiln and pass down through the kiln for further heat treatment.

5. A plant for heat treating pulverulent or granular raw material which comprises:
(a) a kiln having an upper material inlet end portion and a lower material outlet end portion;
(b) means communicating with the lower material outlet end portion of the kiln for cooling the material exiting therefrom;
(c) at least two multi-stage preheater strings, the first preheater string having means for directing raw material thereto and a last stage communicating with the upper material inlet end portion of the kiln such that hot kiln exit gases are directed thereto from the upper material inlet end portion of the kiln;
(d) means connected to the second preheater string for calcining preheated raw material directed thereto;
(e) means communicating the cooling means with said calcining means of said second preheater string for directing heated cooling air from the cooling means to the calcining means;
(f) means for dividing the raw material directed to the first preheater string into at least two divisional flows, said dividing means adapted to provide at least a first divisional flow comprised of substantially the maximum amount of raw material which can be substantially completely calcined by contact with the kiln exit gases;
(g) means for directing said first divisional flow from said first preheater string generally toward the material inlet end portion of the kiln at a location and in a direction to be entrained by hot gases exiting the kiln;
(h) means for directing said second divisional flow from said first preheater string to said calcining means of said second preheater string for at least partially calcining therein;
(i) means for directing the at least partially calcined material from said calcining means to the last stage of said second preheater string;
(j) means for receiving and combining the materials from said first and second preheater strings; and
(k) means for introducing the combined materials from the first and second preheater strings to the upper material inlet end portion of the kiln at a location upstream with respect to the flow of kiln exit gases, of the point of entrainment of said first divisional flow of material and in a direction so as to avoid entrainment by the hot kiln exit gases and pass down through the kiln for further heat treatment.

6. The plant according to claim 5 wherein said material dividing means is configured so as to provide a first divisional flow comprised of approximately 15 to 20 percent of the total amount of raw material directed to the plant and thereby the first divisional flow having substantially the maximum amount of raw material substantially completely calcinable by the kiln exit gases.

7. A plant for heat treating pulverous or granular raw material which comprises:
(a) a rotary kiln having an upper material inlet end portion for receiving preheated, at least partially calcined raw material and a lower material outlet end portion for exiting cement clinker;
(b) a clinker cooler communicating with the lower material outlet end portion of the rotary kiln for cooling the cement clinker exiting therefrom;
(c) at least two multi-stage cyclone preheater strings, the first preheater string having means for directing raw material thereto, a last cyclone stage, and a penultimate stage comprised of at least two preheater sub-stages;

(d) a riser pipe communicating the upper material inlet end portion of the rotary kiln with the last cyclone stage of the first preheater string for directing hot kiln exit gases to the last cyclone stage of the first preheater string;

(e) a calciner connected to the second preheater string for calcining preheated raw material directed thereto;

(f) a conduit communicating the clinker cooler with said calciner of the second preheater string for directing heated cooling air from the clinker cooler to said calciner to be used as combustion and preheating air;

(g) means for dividing the raw material directed to the first preheater string into at least two divisional flows so that each divisional flow is directed to an associated sub-stage of the penultimate stage of the first preheater string, said dividing means providing a first divisional flow comprised of 15 to 20 percent of the total amount of raw material directed to the plant so that the first divisional flow is substantially the maximum amount of raw material substantially completely calcinable in said riser pipe by the kiln exit gases;

(h) a conduit for directing said first divisional flow from said associated sub-stage of the penultimate stage of the first preheater string to at least one of the material inlet end portion of the kiln and the riser pipe at a location and in a direction such that the first divisional flow is entrained by the hot gases exiting the kiln;

(i) a conduit for directing said second divisional flow from said associated sub-stage of the penultimate stage of the first preheater string to said calciner of the second preheater string for at least partial calcination therein;

(j) a conduit for directing the at least partially calcined material from said calciner of said second preheater string to the last stage of said second preheater string;

(k) means for receiving and combining the substantially completely calcined raw material of the first preheater string with at least partially calcined material of the second string; and (l) means for directing the combined flow of at least partially calcined material to the upper material inlet end portion of the rotary kiln at a location upstream with respect to the flow of kiln gases, of the location at which the first divisional flow is entrained by the hot gases exiting the kiln.

* * * * *